(12) United States Patent
Kita et al.

(10) Patent No.: US 12,275,313 B2
(45) Date of Patent: Apr. 15, 2025

(54) PROPULSION SYSTEM OF AIRCRAFT

(71) Applicant: HONDA MOTOR CO., LTD., Tokyo (JP)

(72) Inventors: Akinori Kita, Wako (JP); Takeshi Matsumoto, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 287 days.

(21) Appl. No.: 17/946,070

(22) Filed: Sep. 16, 2022

(65) Prior Publication Data

US 2023/0099869 A1 Mar. 30, 2023

(51) Int. Cl.
| | |
|---|---|
| *B60L 50/61* | (2019.01) |
| *B64D 27/10* | (2006.01) |
| *F02C 9/00* | (2006.01) |
| *F02K 3/00* | (2006.01) |
| *H01M 10/42* | (2006.01) |

(52) U.S. Cl.
CPC .............. *B60L 50/61* (2019.02); *B64D 27/10* (2013.01); *F02C 9/00* (2013.01); *F02K 3/00* (2013.01); *H01M 10/425* (2013.01); *B60L 2200/10* (2013.01); *H01M 2010/4271* (2013.01); *H01M 2220/20* (2013.01)

(58) Field of Classification Search
CPC ..... B60L 50/61; B60L 2200/10; B64D 27/10; F02C 9/00; F02K 3/00; H01M 10/425; H01M 2010/4271; H01M 2220/20
See application file for complete search history.

(56) References Cited

U.S. PATENT DOCUMENTS

| | | | |
|---|---|---|---|
| 5,789,882 A | 8/1998 | Ibaraki et al. | |
| 6,380,640 B1* | 4/2002 | Kanamori | B60K 6/445 290/40 C |
| 8,727,271 B2 | 5/2014 | Salyer | |

(Continued)

FOREIGN PATENT DOCUMENTS

| | | |
|---|---|---|
| JP | 09-098516 | 4/1997 |
| JP | 2000-087774 | 3/2000 |

(Continued)

OTHER PUBLICATIONS

Japanese Notice of Allowance for Japanese Patent Application No. 2021-156670 mailed May 28, 2024.

*Primary Examiner* — Naeem Taslim Alam
(74) *Attorney, Agent, or Firm* — Amin, Turocy & Watson, LLP

(57) ABSTRACT

The propulsion system have a load change detecting unit detecting a load change and an operating point control unit controlling power operating points defined using a torque T and a rotation number Ne. The operating point control unit calculates target power operating points 44 and 54 corresponding to the load after change for first power operating points 41 and 51 that are current power operating points in a case in which a change in the load is detected by the load change detecting unit. By changing the fuel flow in a range not exceeding a predetermined fuel line, the operating point control unit moves the power operating points from first power operating points 41 and 51 to second power operating points 42 and 52, third power operating points 43 and 53, and target power operating points 44 and 54 in order.

6 Claims, 7 Drawing Sheets

(56) References Cited

U.S. PATENT DOCUMENTS

| | | | |
|---|---|---|---|
| 2012/0277969 A1* | 11/2012 | Rossotto | B64C 27/14 |
| | | | 60/773 |
| 2018/0354635 A1* | 12/2018 | Wagner | B64D 27/24 |
| 2020/0148374 A1 | 5/2020 | Kawai | |
| 2023/0182916 A1* | 6/2023 | Resnick | B60L 58/12 |

FOREIGN PATENT DOCUMENTS

| JP | 2008-195233 | 8/2008 |
|---|---|---|
| JP | 2020-075649 | 5/2020 |

* cited by examiner

PROPULSION SYSTEM OF AIRCRAFT

CROSS-REFERENCE TO RELATED APPLICATION

Priority is claimed on Japanese Patent Application No. 2021-156670 filed Sep. 27, 2021, the content of which is incorporated herein by reference.

BACKGROUND OF THE INVENTION

Field of the Invention

The present disclosure relates to a propulsion system of an aircraft.

Description of Related Art

Conventionally, various technologies of propulsion systems for aircrafts for connecting a power generator to a compressor or a turbine mounted in an airframe such as an aircraft and driving a plurality of propellers using electric power supplied from this power generator have been proposed.

For example, in Patent Document 1 (U.S. Pat. No. 8,727, 271), a configuration of a propulsion system including a plurality of gas turbine engines, a power generator generating electric power by operating the gas turbine engines, and a battery supplying electric power to a motor of a propeller has been disclosed. According to the technology described in Patent Document 1, by configuring a hybrid-type propulsion system acquired by combining a power generator connected to the gas turbine engines and a battery, various situations such as a malfunction of a gas turbine engine and the like are assumed to be able to be responded to.

SUMMARY OF THE INVENTION

However, when an aircraft takes off/lands or stops in the air, the posture of the airframe is maintained by controlling rotation of a plurality of propellers. Generally, for a vertical taking-off and landing aircraft to perform stable taking-off and landing, the aircraft accelerates propellers all at once at the time of taking off and decelerates the propellers all at once at the time of landing. At this time, there are cases in which there is a load change in a step form in a short period of time for an aircraft.

In a conventional technology described in Patent Document 1 or the like, for example, by accelerating (or decelerating) a gas turbine engine by increasing (decreasing) a flow rate of a fuel supplied to the gas turbine engine, the load change in a step form is handled. However, in order to increase the flow rate of a fuel, it is necessary to perform control such that a power operating point of the gas turbine engine does not exceed a predetermined fuel line. In other words, the amount of change in the flow rate of the fuel is restricted. For this reason, in the conventional technology, a time required for accelerating (decelerating) the gas turbine engine may not be sufficiently shortened, and it may be difficult to quickly follow a load change in the shape of a step. Thus, insufficient power according to being unable to follow needs to be supplemented using power supplied from a battery. For this reason, a required capacity of the battery becomes large, and the battery and a cooling system thereof are increased in size, and there is concern that the weight may be increased. Furthermore, there is concern that the life of the battery may be shortened.

An object of the present disclosure is to provide a propulsion system of an aircraft capable of inhibiting a decrease in the life of a battery together with decreasing a size of the battery and a cooling system thereof compared with that according to the conventional technology.

In order to solve the problems described above, a propulsion system of an aircraft according to the present disclosure employs the following configurations.

(1) According to an aspect of the present disclosure, there is provided a propulsion system of an aircraft mounted in an airframe of the aircraft, the propulsion system including: a gas turbine element including a compressor and a turbine that rotates integrally with the compressor; a power generator connected to the gas turbine element through a rotation shaft; a battery accumulating electric power generated by the power generator; an electric motor driven by at least one of electric power from the power generator and electric power from the battery; a propeller driven by the electric motor; a gas turbine control unit controlling an output of the gas turbine element; a power generator control unit controlling an amount of generated power of the power generator; a flight state detecting unit detecting a flight state of the aircraft; a load change detecting unit detecting a load change of a request output for the aircraft based on the flight state detected by the flight state detecting unit; and an operating point control unit controlling power operating points each defined using a torque and a rotation number of the rotation shaft based on the flight state detected by the flight state detecting unit, in which the operating point control unit has a reference operation line acquired by joining a plurality of power operating points at which an output defined as a product of the torque and the rotation number is constant on an operating point map onto which the power operating points are mapped, and the operating point control unit: calculates target power operating points corresponding to the load after change for first power operating points that are current power operating points on the operating point map in a case in which a change in the load is detected by the load change detecting unit; by changing a fuel flow in a range not exceeding a predetermined fuel line using the gas turbine control unit, moves the power operating points of the gas turbine element from the first power operating points present on the reference operation line to second gas turbine power operating points that have the same torques as the target power operating points and, at the same time, moves the power operating points of the power generator from the first power operating points present on the reference operation line to second power generator power operating points that are present on the reference operation line and have the same rotation numbers as the second gas turbine power operating points using the power generator control unit; and after the power operating points are moved to the second gas turbine power operating points and the second power generator power operating points, moves the power operating points of the gas turbine element from the second gas turbine power operating points to third gas turbine power operating points matching the target power operating points with the torque maintained to be constant using the gas turbine control unit, at the same time, moves the power operating points of the power generator from the second power generator power operating points to third power generator power operating points that are present on the reference operation line and have the same rotation number as the third gas turbine power operating points using the power generator control unit, and, after the power operating points are moved to the third gas turbine power operating points and the third power generator power operating points, sets the power operating points of the gas turbine element as the target power operating points by maintaining the power operating points for a predetermined time without moving the power operating points from the third gas turbine power operating points using the gas turbine control unit and, at the same time, moves the power operating points of the power generator from the third power generator power operating points to the target power operating points within the predetermined time using the power generator control unit.

(2) In the propulsion system of the aircraft according to the aspect (1) described above, in a case in which an increase in the load is detected by the load change detecting unit, the predetermined fuel line is a surge line, and the operating point control unit moves the power operating points of the gas turbine element by increasing the fuel flow in a range not exceeding the surge line using the gas turbine control unit.

(3) In the propulsion system of the aircraft according to the aspect (1) described above, in a case in which a decrease in the load is detected by the load change detecting unit, the predetermined fuel line is an accidental fire line, and the operating point control unit moves the power operating points of the gas turbine element by decreasing the fuel flow in a range not below the accidental fire line using the gas turbine control unit.

(4) According to another aspect of the present disclosure, there is provided a propulsion system of an aircraft mounted in an airframe of the aircraft, the propulsion system including: a gas turbine element including a compressor and a turbine that rotates integrally with the compressor; a power generator connected to the gas turbine element through a rotation shaft; a battery accumulating electric power generated by the power generator; an electric motor driven by at least one of electric power from the power generator and electric power from the battery; a propeller driven by the electric motor; a gas turbine control unit controlling an output of the gas turbine element; a power generator control unit controlling an amount of generated power of the power generator; a flight state detecting unit detecting a flight state of the aircraft; a load change detecting unit detecting a load change of a request output for the aircraft based on the flight state detected by the flight state detecting unit; and an operating point control unit controlling power operating points each defined using a torque and a rotation number of the rotation shaft based on the flight state detected by the flight state detecting unit, in which the operating point control unit has a torque constant line at which the torque is constant on an operating point map onto which the power operating points are mapped, and the operating point control unit: calculates target power operating points corresponding to the load after change for first power operating points that are current power operating points on the operating point map in a case in which a change in the load is detected by the load change detecting unit; by changing a fuel flow in a range not exceeding a predetermined fuel line using the gas turbine control unit, moves the power operating points of the gas turbine element from the first power operating points present on the torque constant line to second gas turbine power operating points that have the same torques as the target power operating points and, at the same time, moves the power operating points of the power generator from the first power operating points present on the torque constant line to second power generator power operating points that are present on the torque constant line and have the same rotation numbers as the second gas turbine power operating points using the power generator control unit; and after the power operating points are moved to the second gas turbine power operating points and the second power generator power operating points, moves the power operating points of the gas turbine element from the second gas turbine power operating points to third gas turbine power operating points matching the target power operating points with the torque maintained to be constant using the gas turbine control unit, at the same time, moves the power operating points of the power generator from the second power generator power operating points to third power generator power operating points that are present on the torque constant line and have the same rotation number as the third gas turbine power operating points using the power generator control unit, and, after the power operating points are moved to the third gas turbine power operating points and the third power generator power operating points, sets the power operating points of the gas turbine element as the target power operating points by maintaining the power operating points for a predetermined time without moving the power operating points from the third gas turbine power operating points using the gas turbine control unit and, at the same time, moves the power operating points of the power generator from the third power generator power operating points to the target power operating points within the predetermined time using the power generator control unit.

(5) In the propulsion system of the aircraft according to the aspect (4) described above, in a case in which an increase in the load is detected by the load change detecting unit, the predetermined fuel line is a surge line, and the operating point control unit moves the power operating points of the gas turbine element by increasing the fuel flow in a range not exceeding the surge line using the gas turbine control unit.

(6) In the propulsion system of the aircraft according to the aspect (4) described above, in a case in which a decrease in the load is detected by the load change detecting unit, the predetermined fuel line is an accidental fire line, and the operating point control unit moves the power operating points of the gas turbine element by decreasing the fuel flow in a range not below the accidental fire line using the gas turbine control unit.

According to the aspect (1), in a case in which a load change occurs, the operating point control unit responds to an increase/decrease in the output according to the load change by moving power operating points. More specifically, first, for the first power operating points, the operating point control unit calculates the target power operating points corresponding to the load after change. Next, by changing the fuel flow in a range not exceeding a predetermined fuel line, the power operating points of the gas turbine element and the power generator are moved to the second power operating points. In accordance with this, while the output from the power generator is maintained, the torque of the gas turbine element is increased. Thereafter, the operating point control unit moves the power operating points of the gas turbine element to the third gas turbine power operating points matching the target power operating points with the torque maintained to be constant and, at the same time, moves the power operating points of the power generator to the third power generator power operating points that are on the reference operation line and have the same rotation number as the third gas turbine power operating points. In this way, the torque of the gas turbine element is increased, and the torque of the power generator is decreased. In accordance with this, a difference between the torque of the gas turbine element and the torque of the power generator becomes large. Furthermore, the operating point control unit sets the third gas turbine power operating points as the target gas turbine power operating points and, at the same time, moves the power operating points of the power generator to the target gas turbine power operating points. For the third gas turbine power operating points, a difference between the torques of the gas turbine element and the power generator is large, and thus the power operating points of the power generator can be moved to the target power operating points in a short period of time. Thus, the output from the power generator can be caused to follow a load change in a very short period of time from an occurrence of the load. An amount of electric power of the battery that is defined by a product of electric power and time can be decreased, and thus, compared with the conventional technology, the size of the battery can be decreased. In addition, the use frequency of the battery is decreased, and thus the cooling system for the battery can be decreased in size, and reduction of the life of the battery can be inhibited.

Therefore, compared with the conventional technology, the propulsion system of an aircraft capable of decreasing the battery and the cooling system thereof in size and inhibiting reduction in the life of the battery can be provided.

According to the aspect (2), in a case in which the load is increased, the operating point control unit increases the fuel flow in a range not exceeding the surge line. In accordance with this, while the fuel is used with high efficiency, an increase in the load variations can be quickly followed. In addition, the amount of electric power supplemented by the battery can be decreased. Accordingly, an increase in the load variation can be responded to while the amount of electric power extracted from the battery is decreased compared with in the conventional case.

According to the aspect (3), in a case in which the load is decreased, the operating point control unit decreases the fuel flow in a range not exceeding the accidental fire line. In accordance with, a decrease in the load variation can be quickly followed while the gas turbine element is operated stably. In addition, the amount of electric power absorbed by the battery can be decreased. Thus, a decrease in the load variation can be responded to while the amount of electric power accumulated in the battery is decreased compared with in the conventional case.

According to the aspect (4), the operating point control unit moves power operating points of the gas turbine element from the first gas turbine power operating points to the second gas turbine power operating points and the third gas turbine power operating points in order. Simultaneously, the operating point control unit moves the power operating points of the power generator to the second power generator power operating points and the third power generator power operating points in order along the torque constant line. By moving the power operating points of the power generator with the torque maintained to be constant, a difference between the torque of the gas turbine element and the torque of the power generator can be increased while the output from the power generator is changed in accordance with a load change. Thereafter, the operating point control unit sets the third gas turbine power operating points as the target gas turbine power operating points and, simultaneously, moves the power operating points of the power generator to the target power generator power operating points. A torque difference between the gas turbine elements and the power generator is large for the third power operating points and thus the power operating points of the power generator can be moved to the target power operating points in a short period of time. Thus, the output from the power generator can be caused to follow a load change in a very short period of time from an occurrence of the load. As a result, an amount of electric power of the battery that is defined by a product of electric power and time can be decreased, and thus, compared with the conventional technology, the size of the battery can be decreased. In addition, the use frequency of the battery is decreased, and thus the cooling system for the battery can be decreased in size, and reduction of the life of the battery can be inhibited.

Therefore, compared with the conventional technology, the propulsion system of an aircraft capable of decreasing the battery and the cooling system thereof in size and inhibiting reduction in the life of the battery can be provided.

According to the aspect (5), in a case in which the load is increased, the operating point control unit increases the fuel flow in a range not exceeding the surge line. In accordance with this, while the fuel is used with high efficiency, an increase in the load variations can be quickly followed. In addition, the amount of electric power supplemented by the battery can be decreased. Accordingly, an increase in the load variation can be responded to while the amount of electric power extracted from the battery is decreased compared with in the conventional case. When the load is increased, the amount of electric power increases relatively gently, and thus a load for the battery can be reduced. Therefore, the durability of the battery can be further improved.

According to the aspect (6), in a case in which the load is decreased, the operating point control unit decreases the fuel flow in a range not exceeding the accidental fire line. In accordance therewith, a decrease in the load variation can be quickly followed while the gas turbine element is operated stably. In addition, the amount of electric power absorbed by the battery can be decreased. Thus, a decrease in the load variation can be responded to while the amount of electric power accumulated in the battery is decreased compared with in the conventional case. When the load is decreased, the amount of electric power decreases relatively gently, and thus a load for the battery can be reduced. Therefore, the durability of the battery can be further improved.

DETAILED DESCRIPTION OF THE INVENTION

Hereinafter, embodiments of the present disclosure will be described with reference to the drawings.

First Embodiment (Propulsion System of Aircraft)

Figure 1:
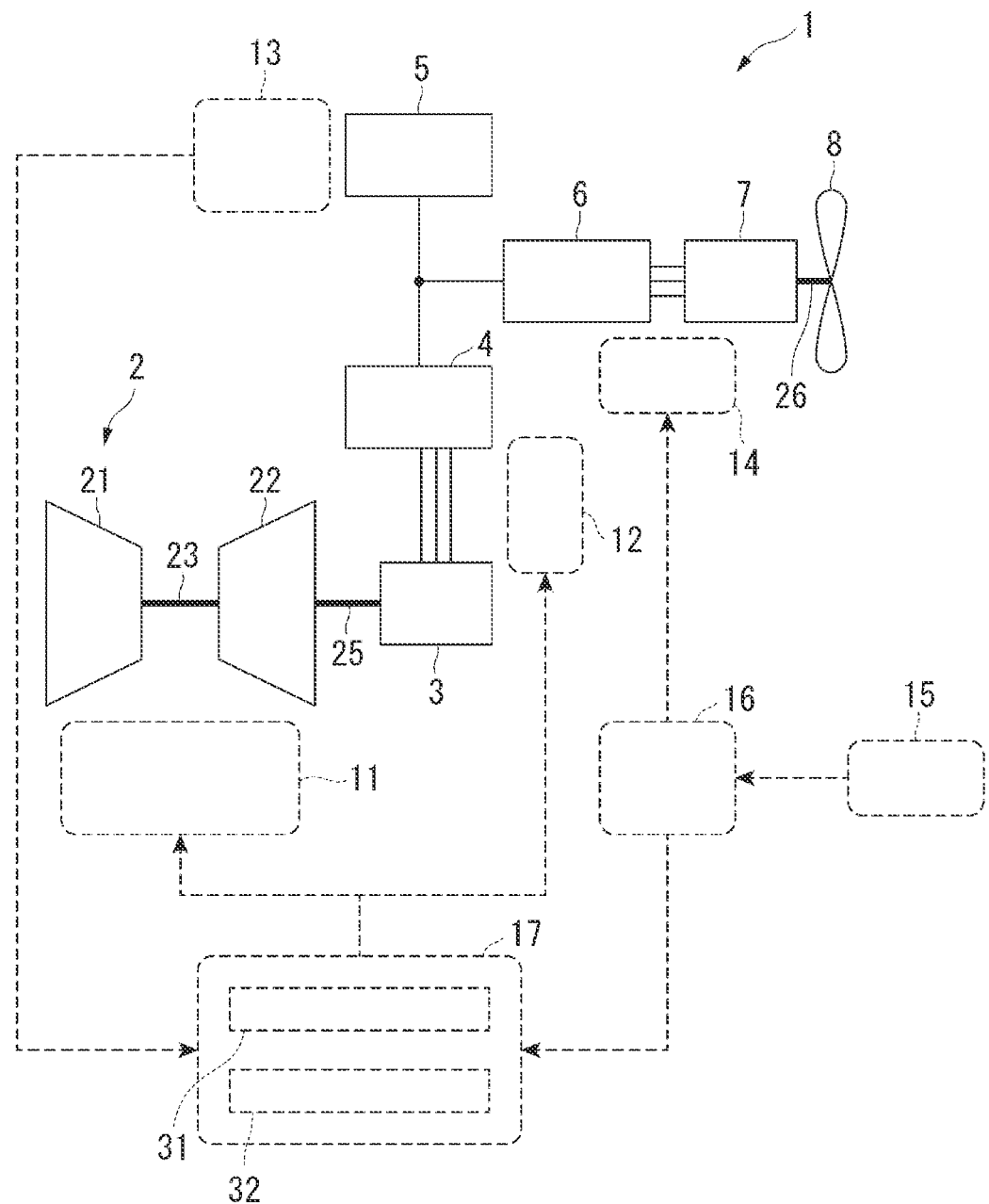
FIG. 1 is a schematic configuration diagram of a propulsion system of an aircraft according to a first embodiment.

FIG. 1 is a schematic configuration diagram of a propulsion system 1 of an aircraft according to a first embodiment.

The propulsion system 1 of an aircraft (hereinafter may be simply referred to as a propulsion system 1) is mounted in an airframe of an aircraft not shown. The propulsion system 1 is a hybrid propulsion system that causes an aircraft to be propelled by a plurality of electric motors 7 driven using electric power generated by a power generator 3 to be described below in detail.

The propulsion system 1 of an aircraft includes a gas turbine element 2, a power generator 3, a battery 5, an electric motor 7, a propeller 8, and a plurality of control units. The plurality of control units include a gas turbine ECU 11, a power generator ECU 12, a battery monitoring unit 13, a motor ECU 14, a flight state detecting unit 15, a flight controller 16, and a hybrid control unit 17, (Gas Turbine Element)

The gas turbine element 2 is a so-called gas turbine engine having a compressor 21, a turbine 22, and a connecting shaft 23. The compressor 21 compresses inhaled air inhaled from a ventilation hole, which is not shown, installed in an airframe of an aircraft. The turbine 22 is connected to the compressor 21 and rotates together with the compressor 21. The connecting shaft 23 connects the compressor 21 and the turbine 22. The compressor 21 is connected to one end of the connecting shaft 23. The turbine 22 is connected to the other end of the connecting shaft 23.

(Power Generator)

The power generator 3 is connected to the gas turbine element 2 through a rotation shaft 25. The power generator 3 and the gas turbine element 2 are directly connected to each other through the rotation shaft 25 without disposing a transmission mechanism or the like therebetween. Thus, the power generator 3 rotates together with the gas turbine element 2. The rotation shaft 25 is installed on the same axis as that of the connecting shaft 23 of the gas turbine element 2. The rotation shaft 25 and the connecting shaft 23 may be integrated together. The power generator 3 generates electric power (AC power) in accordance with driving of the turbine 22. The AC power generated by the power generator 3 is converted into DC power by a converter 4 of a power drive unit (PDU) and is stored in the battery 5.

(Battery)

Electric power generated by the power generator 3 is stored in the battery 5. When generated electric power of the converter 4 is above power consumption of an inverter 6, the battery 5 is charged by absorbing surplus electric power. On the other hand, when the generated electric power of the converter 4 is below the power consumption of the inverter 6, the battery 5 is discharged to supplement insufficient electric power.

(Electric Motor)

A plurality of electric motors 7 are disposed in the airframe. The electric motor 7, for example, is a brushless DC motor having a rotor and a stator. Between the electric motor 7 and the propeller 8, a propeller shaft 26 that mechanically connects the electric motor 7 and the propeller 8 is disposed. The propeller 8 rotates in accordance with rotation of the rotor of the electric motor 7 in accordance with a control signal. A control signal is a signal used for controlling an aircraft based on an operation of a pilot or an instruction in an automated operation. The electric motor 7 is connected to the converter 4 (the power generator 3) and the battery 5 through the inverter 6. At least one of discharged electric power from the battery 5 and electric power from the power generator 3 is supplied to the electric motor 7 through the inverter 6. In accordance with this, the electric motor 7 is driven. In addition, the electric motor 7 may include an auxiliary motor and the like used for posture keeping or horizontal propulsion that is not shown.

(Propeller)

The propeller 8 is disposed for each of the plurality of electric motors 7. The rotation number of each propeller 8 (in other words, the rotation number of the electric motor 7) can be independently controlled. By controlling the rotation number of each propeller 8, the aircraft flies in a desired flight state.

(Plurality of Control Units)

The gas turbine ECU 11 (a gas turbine control unit in the claims) controls an operation of the gas turbine element 2. For example, by controlling an amount of air or a fuel flow Wf supplied to the gas turbine element 2, the gas turbine ECU 11 adjusts the rotation number, the torque, and the like of the gas turbine element 2 to desired values.

The power generator ECU 12 (a power generator control unit in claims) controls an operation of the power generator 3. The power generator ECU 12 controls a magnitude of a regenerative torque used for power generation using a rotation force transferred from the gas turbine element 2 through the rotation shaft 25. A magnitude of the regenerative torque is in proportion to a value of current input to the power generator 3. In other words, by adjusting an amount of current input to the power generator 3 using the power generator ECU 12, the magnitude of the regenerative torque in the power generator 3 can be controlled. Since the gas turbine element 2 and the power generator 3 are directly connected using the rotation shaft 25, for example, when the regenerative torque of the power generator 3 is increased from a steady state in which the torques T and the rotation numbers Ne of the gas turbine element 2 and the power generator 3 are constant, the rotation number of the rotation shaft 25 (in other words, the rotation number of the gas turbine element 2 and the power generator 3) decreases. On the other hand, when the regenerative torque of the power generator 3 is decreased from the steady state, the rotation number of the rotation shaft 25 increases.

The battery monitoring unit 13 monitors a power state of the inside of the battery 5.

The motor ECU 14 controls an operation of each of the plurality of electric motors 7. A plurality of motor ECUs 14 may be disposed in correspondence with the electric motors 7. The motor ECU 14 rotates an arbitrary electric motor 7 with a desired rotation number using at least one of electric power form the battery 5 and electric power from the power generator 3.

The flight state detecting unit 15 acquires detection results from various sensors mounted in the aircraft, thereby detecting a flight state of the aircraft. More specifically, the flight state detecting unit 15, for example, acquires information such as a speed, a posture, an altitude, and the like of the aircraft and further calculates a request output of the aircraft based on such information. The flight state detecting unit 15, for example, may further detect information such as an instruction from a pilot, a flight path, and the like.

The flight controller 16 acquires a detection result acquired by the flight state detecting unit 15. The flight controller 16 determines a rotation number of the propeller 8 based on the detection result and, at the same time, calculates required electric power. The flight controller 16 can communicate with the motor ECU 14 and the hybrid control unit 17 to be described below.

The hybrid control unit 17 communicates with the flight controller 16, the gas turbine ECU 11, the power generator ECU 12, and the battery monitoring unit 13. The hybrid control unit 17 receives a signal from the flight controller 16 and transmits a signal to the flight controller 16. The hybrid control unit 17 transmits command signals to the gas turbine ECU 11, the power generator ECU 12, and the battery monitoring unit 13 based on information from the flight controller 16 and acquires states of the gas turbine ECU 11, the power generator ECU 12, and the battery monitoring unit 13. The hybrid control unit 17 includes a load change detecting unit 31 and an operating point control unit 32.

Figure 2:
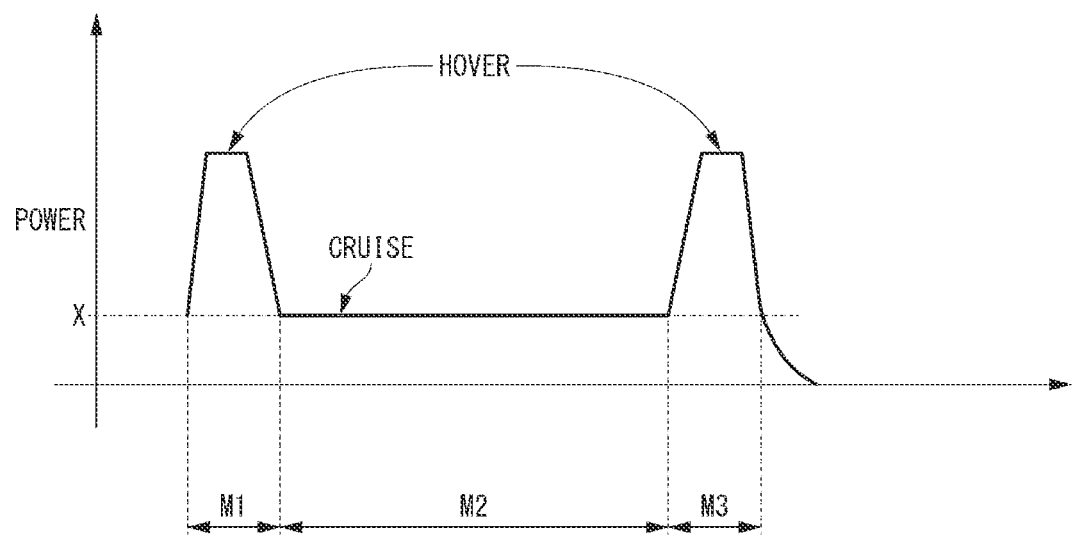
FIG. 2 is a graph showing a relation between an operation mode of an aircraft and a request output according to the first embodiment.

FIG. 2 is a graph showing a relation between an operation mode of an aircraft and a request output according to the first embodiment. As shown in FIG. 2, an aircraft glides and takes off or vertically takes off (hovering), rises and accelerates, and cruises. Then, the aircraft descends and decelerates, hovers (hovering), and lands. A state in which an aircraft moves in a direction including a horizontal direction after reaching a predetermined altitude is a cruise mode (see M2). A state in which an aircraft performs an operation of taking off or an operation of landing is a taking-off/landing mode or a hoovering mode (see M1 and M3; hereinafter collectively referred to as a hovering mode). In the hovering mode, a larger output is required than in the cruise mode. For example, even when several propellers among a plurality of propellers 8 are broken, an aircraft can secure an output required for maintaining the hovering mode. In the hovering mode, for performing stable taking-off and landing, propellers are accelerated all at once at the time of taking off, and the propellers are decelerated all at once at the time of landing. At this time, there are cases in which there are a large load change in a step form in a short period of time.

As shown in FIG. 1, the load change detecting unit 31 detects a load change of a required output for the aircraft in each of such drive modes based on a flight state of the aircraft detected by the flight state detecting unit 15. For example, there are cases in which a load change occurs when posture control is performed in the hovering mode. For example, for stable taking-off/landing, also when the propellers 8 are accelerated or decelerated all at once in the hovering mode, there are cases in which a load change occurs. A load change occurs in a step form in a short period of time with respect to a basic load that is an average load at a time when an aircraft performs various operations such as cruising, taking-off/landing, and hovering. In other words, a load change is a difference from the basis load.

Figure 3:
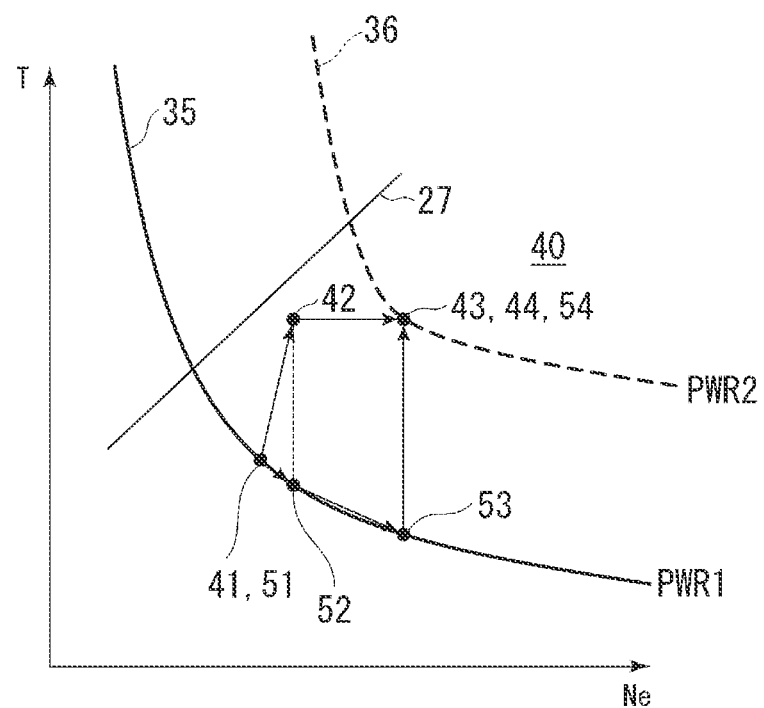
FIG. 3 is an operating point map showing control using an operating point control unit in a case in which a load is increased in the first embodiment.

FIG. 3 is an operating point map 40 showing control using the operating point control unit 32 in a case in which a load is increased in the first embodiment.

The operating point control unit 32 controls power operating points of the gas turbine element 2 and the power generator 3 based on the flight state detected by the flight state detecting unit 15, thereby controlling an output for a load change. A power operating point is a value representing a predetermined output value that is defined by an arbitrary torque T and a rotation number Ne in the rotation shaft 25 of the power generator 3. As shown in FIG. 3, the operating point control unit 32 has a two-dimensional operating point map 40 having the torque T as its vertical axis and the rotation number Ne as its horizontal axis. In other words, a point that is uniquely determined using a combination of an arbitrary torque T and a rotation number Ne on the operating point map 40 is a power operating point, and the operating point control unit 32 can set (move) a power operating point at a desired position on this operating point map 40. In a case in which it is detected that the load has been changed by the load change detecting unit 31, the operating point control unit 32 calculates a position of the current power operating point in the operating point map 40 and moves the power operating point in accordance with a magnitude of the load.

In this embodiment, in a case in which a load change has been detected, the operating point control unit 32 sets a reference operation line 35 on the operating point map 40.

The reference operation line 35 is an inverse proportional-type curve joining a plurality of power operating points at which output values defined by a product of a torque and a rotation number is constant. In other words, a torque and a rotation number at an arbitrary power operating point on the reference operation line 35 is represented as T×Ne=α (constant)

(Operation of Operating Point Control Unit in Case in which a Change in Load Occurs Such that Load Increases)

In FIG. 3, reference numerals 41, 42, 43, and 44 represent power operating points of the gas turbine element 2, and reference numerals 51, 52, 53, and 54 represent power operating points of the power generator 3. When a change (increase) in the load is detected by the load change detecting unit 31, the operating point control unit 32 detects first power operating points 41 and 51 that are current power operating points on the operating point map 40 and calculates target power operating points 44 and 54 corresponding to the load after change. At this time, the operating point control unit 32 selects points at which the drive efficiency is the highest on the reference operation line 35 as first power operating points 41 and 51. Similarly, the operating point control unit 32 selects points at which the drive efficiency is the highest on an operation line 36 after the load change as target power operating points 44 and 54.

In addition, the operating point control unit 32 sets second power operating points 42 and 52 and third power operating points 43 and 53. The operating point control unit 32 moves the power operating points in order of the first power operating points 41 and 51, the second power operating points 42 and 52, the third power operating points 43 and 53, and the target power operating points 44 and 54. In accordance with this, the operating point control unit 32 performs control of the gas turbine element 2 and the power generator 3 such that electric power can be output to follow the load change.

More specifically, the first power operating points 41 and 51 are positions at which power operation points of the propulsion system 1 are located in a steady state before movement control of the power operating points using the operating point control unit 32 is performed and are current power operating points on the operating point map 40. The first operating point 41 of the gas turbine element 2 (a first gas turbine power operating point) and the first power operating point 51 of the power generator 3 (a first power generator power operating point) are located at the same point. The first power operating points 41 and 51 are located on the reference operation line 35.

The target power operating points 44 and 54 are located at a point at which the torque T and the rotation number Ne are larger than those at the first power operating points 41 and 51, in other words, a point at which an output is larger than the reference operation line 35. The target power operating point of the gas turbine element 2 (a target gas turbine power operating point 44) and the target power operating point of the power generator 3 (a target power generator power operating point 54) are located at the same point.

The second power operating point of the gas turbine element 2 (a second gas turbine power operating point 42) is located at a point at which the torque T and the rotation number Ne are larger than those at the first gas turbine power operating point 41, in other words, a point at which the output is larger than the reference operation line 35. The second gas turbine power operating point 42 is a point of the gas turbine element 2 that passes through an acceleration transient in accordance with an increase in the fuel flow Wf. The second gas turbine power operating point 42 is a power operating point that is disposed between the first gas turbine power operating point 41 and the target gas turbine power operating point 44 with respect to the rotation number Ne and has the same torque T as the target gas turbine power operating point 44.

The second power operating point of the power generator 3 (a second power generator power operating point 52) is located on the reference operation line 35. The second power generator power operating point 52 is a power operating point that is disposed on the reference operation line 35 and has the same rotation number Ne as the second gas turbine power operating point 42.

The third power operating point of the gas turbine element 2 (a third gas turbine power operating point 43) is a power operating point that has the same torque T as the second gas turbine power operating point 42 and has the same rotation number Ne as the target gas turbine power operating point 44. In other words, the third gas turbine power operating point 43 matches the target gas turbine power operating point 44.

The third power operating point of the power generator 3 (a third power generator power operating point 53) is located on the reference operation line 35. The third power generator power operating point 53 is a power operating point that is disposed on the reference operation line 35 and has the same rotation number Ne as the third gas turbine power operating point 43.

(Control Performed by Operating Point Control Unit in Case in which a Change in Load Occurs Such that Load Increases)

Next, control of the operating point control unit 32 in a case in which a change in the load occurs such that the load increases will be described in detail.

Figure 4:
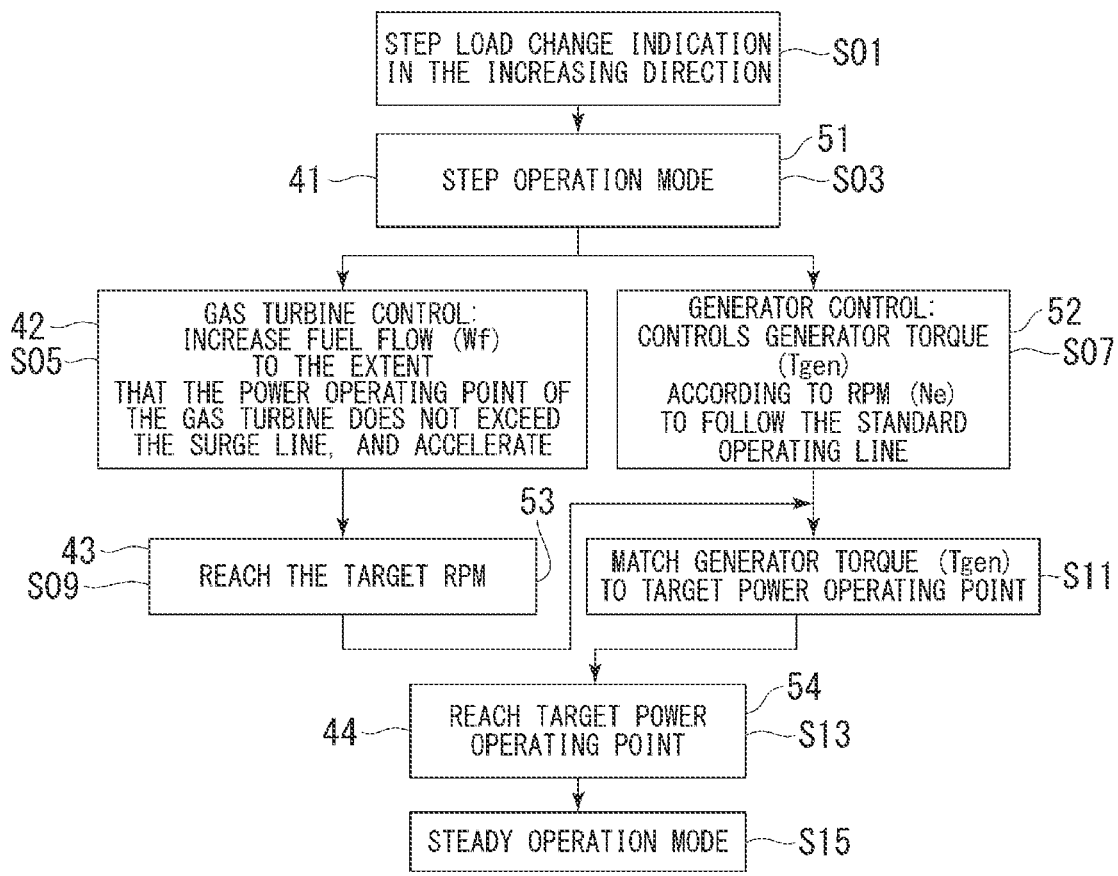
FIG. 4 is a block diagram of an operating point control unit in a case in which a load increases in the first embodiment.

FIG. 4 is a block diagram of the operating point control unit 32 in a case in which the load increases in the first embodiment. In FIG. 4, Step S05 is control for the gas turbine element 2, and Step S07 is control for the power generator 3. The other Steps S01, S03, S09, S11, S13, and S15 represent control common to both the gas turbine element 2 and the power generator 3.

As shown in FIGS. 3 and 4, first, when an increase in the load is detected by the load change detecting unit 31, the operating point control unit 32 transmits a command signal such that a load change having a step form in an increasing direction is performed (Step S01).

Next, the operating point control unit 32 transitions the propulsion system 1 to a step drive mode for following the change in the load having the step form (Step S03). At this time, the operating point control unit 32 detects the first gas turbine power operating point 41 and the first power generator power operating point 51 that are current power operating points. At this time, the first gas turbine power operating point 41 and the first power generator power operating point 51 match each other.

Next, by performing acceleration by increasing the fuel flow Wf within a range not exceeding a predetermined surge line 27 using the gas turbine ECU 11, the operating point control unit 32 moves the power operating point of the gas turbine element 2 from the first gas turbine power operating point 41 to the second gas turbine power operating point 42 (Step S05). The surge line 27 is a fuel line of a case in which an increase in the load is detected. Simultaneously with the control of Step S05, the operating point control unit 32 moves the power operating point of the power generator 3 from the first power generator power operating point 51 to the second power generator power operating point 52 along the reference operation line 35 using the power generator ECU 12 (Step S07). In Step S07, the operating point control unit 32 controls the rotation number Ne and the torque T of the power generator 3 such that the power operating point of the power generator 3 follows the reference operation line 35 while matching a displacement of the rotation number Ne at the power operating point of the gas turbine element 2 in Step S05.

Next, the operating point control unit 32 moves the power operating point of the gas turbine element 2 from the second gas turbine power operating point 42 to the third gas turbine power operating point 43 using the gas turbine ECU 11 with the torque T maintained to be constant (Step S09). Simultaneously, the operating point control unit 32 moves the power operating point of the power generator 3 from the second power generator power operating point 52 to the third power generator power operating point 53 along the reference operation line 35 using the power generator ECU 12. In Step S09, the operating point control unit 32 performs control of the rotation number Ne and the torque T of the power generator 3 such that the power operating point of the power generator 3 follows the reference operation line 35 while matching a displacement of the rotation number Ne at the power operating point of the gas turbine element 2.

Next, the operating point control unit 32 maintains the power operating point of the gas turbine element 2 for a predetermined time without moving from the third gas turbine power operating point 43 using the gas turbine ECU 11 and thus sets the power operating point to the target gas turbine power operating point 44 (Step S11). Simultaneously, the operating point control unit 32 moves the power operating point of the power generator 3 to the target gas turbine power operating point 54 using the power generator ECU 12 while constantly maintaining the rotation number Ne from the third power generator power operating point 53 within a predetermined time.

After the predetermined time elapses, the torque T of the power generator 3 matches the torque of the third gas turbine power operating point 43, whereby the power operating points reach the target power operating points 44 and 54 (Step S13).

After reaching the target power operating points 44 and 54, the operating point control unit 32 transitions the propulsion system 1 to a normal drive mode and ends the movement control of the power operating points (Step S15).

Figure 5:
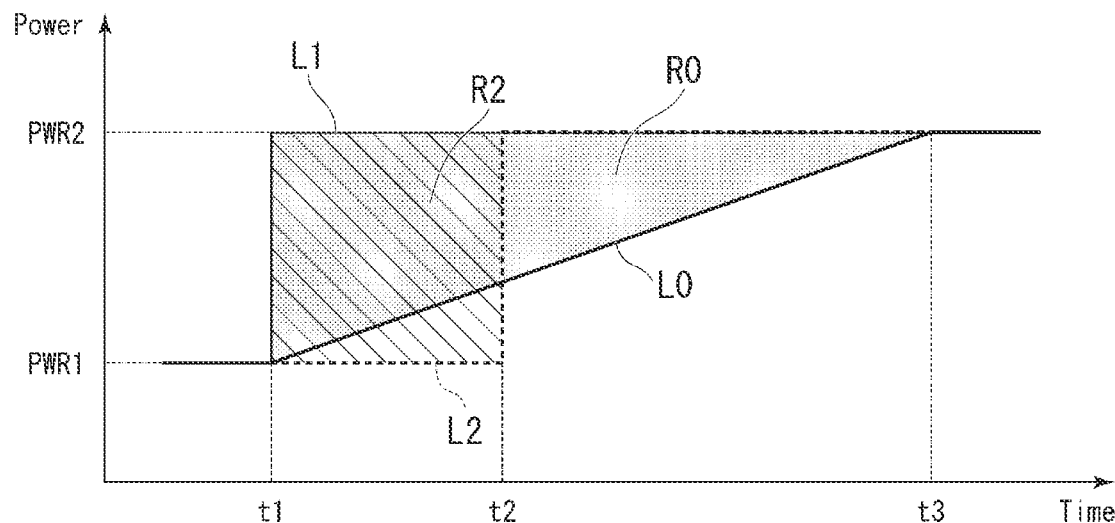
FIG. 5 is a graph representing a power supply amount in a case in which a load for the propulsion system according to the first embodiment is increased.

FIG. 5 is a graph representing a power supply amount supplied in a case in which a load for the propulsion system according to the first embodiment is increased. In FIG. 5, an electric power (Power1) required for the propulsion system 1 before an occurrence of a load change is represented. In addition, an electric power (Power2) required for the propulsion system 1 after an occurrence of a load change is represented. A straight line L1 represents a trend of electric power required for the propulsion system 1 when a load change of an increase occurs. A straight line L0 represents a trend of electric power that can be followed by the power generator 3 when a load change of an increase occurs in the conventional technology. A straight line L2 represents a trend of electric power that can be followed by the power generator 3 when a load change of an increase occurs in this embodiment.

As shown in FIG. 5, in a case in which a load change of an increase occurs at time t1, the electric power required for the propulsion system 1 sharply increases from Power1 to Power2. In contrast to this, in a conventional technology in which the electric power is increased by increasing the fuel flow Wf to the gas turbine element 2, as represented by the straight line L0, the generated electric power of the power generator gently rises over time t1 to time t3 in accordance with an increase in the fuel flow Wf. For this reason, a difference between the required electric power (the straight line L1) and an actual supplied electric power (the straight line L0) needs to be covered by an electric power supplied from the battery. In other words, a size of an area R0 surrounded by the straight line L1 and the straight line L0 in FIG. 5 is equal to an electric energy extracted from the battery in the conventional technology.

On the other hand, in the propulsion system 1 according to this embodiment in which power operating points are controlled by the operating point control unit 32, as represented by the straight line L2, although an output between time t1 to time t2 (<t3) is maintained to be Power1, a power supply amount can be sharply increased at time t2. A size of an area R2 surrounded by a straight line L1 and a straight line L2 shown in FIG. 5 is equal to an electric energy extracted from the battery 5 in this embodiment.

Here, in a case where a time interval from t1 to t2 is shorter than a time interval from t2 to t3, the area R2 is smaller than the area R0. Thus, compared with the conventional technology, the amount of electric energy extracted from the battery 5 can be reduced.

(Operation of Operating Point Control Unit in Case in which a Change in Load Occurs Such that Load Decreases)

Figure 6:
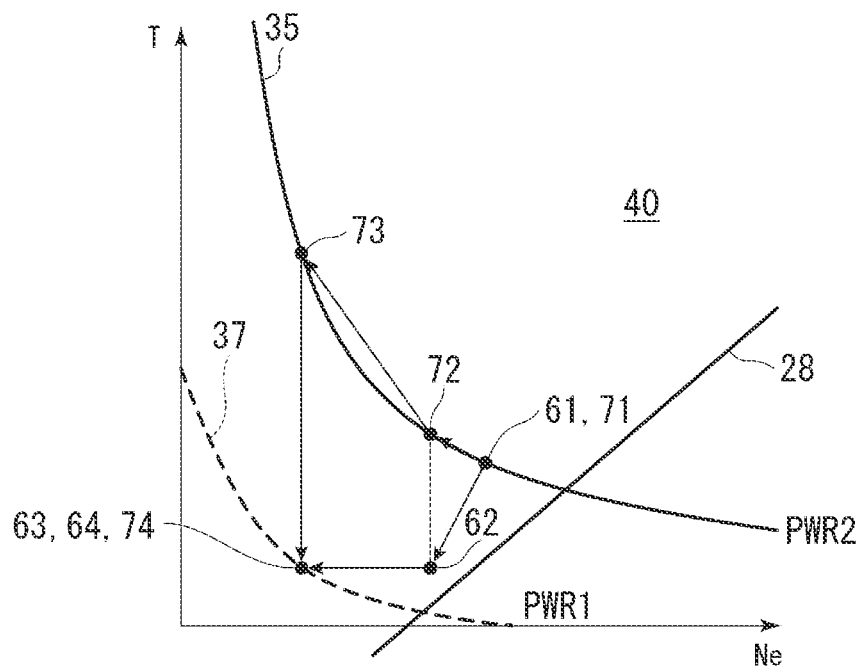
FIG. 6 is an operating point map showing control using an operating point control unit in a case in which a load is decreased in the first embodiment.

Next, an operation of the operating point control unit in a case in which a load change occurs such that the load decreases will be described. FIG. 6 is an operating point map 40 showing control using the operating point control unit 32 in a case in which a load is decreased.

In FIG. 6, reference numerals 61, 62, 63, and 64 represent power operating points of the gas turbine element 2, and reference numerals 71, 72, 73, and 74 represent power operating points of the power generator 3. When a change (decrease) in the load is detected by the load change detecting unit 31, the operating point control unit 32 detects first power operating points 61 and 71 that are current power operating points on the operating point map 40 and calculates target power operating points 64 and 74 corresponding to the load after change. At this time, the operating point control unit 32 selects points at which the drive efficiency is the highest on the reference operation line 35 as first power operating points 61 and 71. Similarly, the operating point control unit 32 selects points at which the drive efficiency is the highest on an operation line 37 after the load change as target power operating points 64 and 74.

In addition, the operating point control unit 32 sets second power operating points 62 and 72 and third power operating points 63 and 73. The operating point control unit 32 moves the power operating points in order of the first power operating points 61 and 71, the second power operating points 62 and 72, the third power operating points 63 and 73, and the target power operating points 64 and 74. In accordance with this, the operating point control unit 32 performs control of the gas turbine element 2 and the power generator 3 such that electric energy can be absorbed to follow the load change.

More specifically, the first power operating points 61 and 71 are positions at which power operation points of the propulsion system 1 are located in a steady state before movement control of the power operating points using the operating point control unit 32 is performed and are current power operating points on the operating point map 40. The first gas turbine power operating point 61 and the first power generator power operating point 71 are located at the same point. The first power operating points 61 and 71 are located on the reference operation line 35.

The target power operating points 64 and 74 are located at a point at which the torque T and the rotation number Ne are smaller than those at the first power operating points 61 and 71, in other words, a point at which an output is smaller than the reference operation line 35. The target gas turbine power operating point 64 and the target gas turbine power operating point 74 are located at the same point.

The second gas turbine power operating point 62 is located at a point at which the torque T and the rotation number Ne are smaller than those at the first gas turbine power operating point 61, in other words, a point at which the output is smaller than the reference operation line 35. The second gas turbine power operating point 62 is a point of the gas turbine element 2 that passes through a decrease transient in accordance with a decrease in the fuel flow Wf. The second gas turbine power operating point 62 is a power operating point that is disposed between the target gas turbine power operating point 64 and the first gas turbine power operating point 61 with respect to the rotation number Ne and has the same torque T as the target gas turbine power operating point 64.

The second power generator power operating point 72 is located on the reference operation line 35. The second power generator power operating point 72 is a power operating point that is disposed on the reference operation line 35 and has the same rotation number Ne as the second gas turbine power operating point 62.

The third gas turbine power operating point 63 is a power operating point that has the same torque T as the second gas turbine power operating point 62 and has the same rotation number Ne as the target gas turbine power operating point 64. In other words, the third gas turbine power operating point 63 matches the target gas turbine power operating point 64.

The third power generator power operating point 73 is located on the reference operation line 35. The third power generator power operating point 73 is a power operating point that is disposed on the reference operation line 35 and has the same rotation number Ne as the third gas turbine power operating point 63.

(Control Performed by Operating Point Control Unit in Case in which a Change in Load Occurs Such that Load Decreases)

Next, control of the operating point control unit 32 in a case in which a change in the load occurs such that the load decreases will be described in detail.

Figure 7:
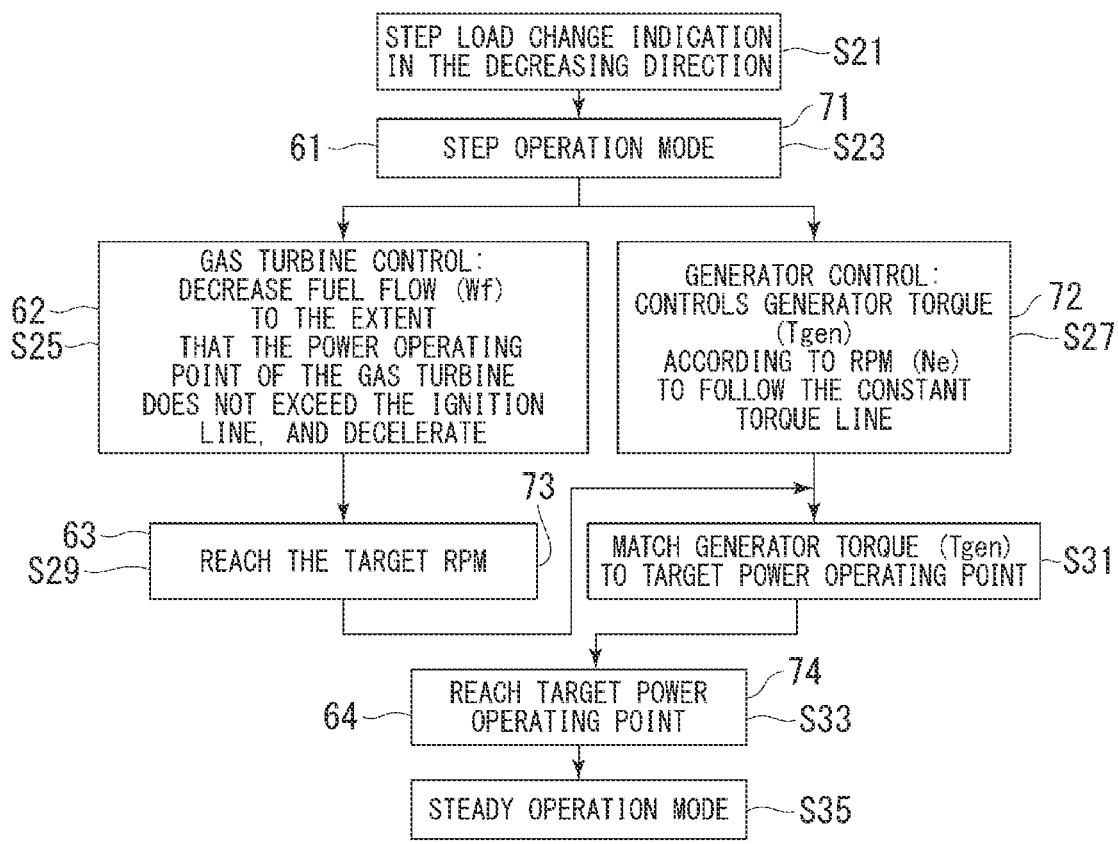
FIG. 7 is a block diagram of an operating point control unit in a case in which a load is decreased in the first embodiment.

FIG. 7 is a block diagram of the operating point control unit 32 in a case in which a load is decreased in the first embodiment. In FIG. 7, Step S25 is control for the gas turbine element 2, and Step S27 is control for the power generator 3. The other Steps S21, S23, S29, S31, S33, and S35 represent control common to both the gas turbine element 2 and the power generator 3.

As shown in FIGS. 6 and 7, first, when a decrease in the load is detected by the load change detecting unit 31, the operating point control unit 32 transmits a command signal such that a load change having a step form in a decreasing direction is performed (Step S21).

Next, the operating point control unit 32 transitions the propulsion system 1 to a step drive mode for following the change in the load having the step form (Step S23). At this time, the operating point control unit 32 detects the first gas turbine power operating point 61 and the first power generator power operating point 71 that are current power operating points. At this time, the first gas turbine power operating point 61 and the first power generator power operating point 71 match each other.

Next, by performing deceleration by decreasing the fuel flow Wf within a range not exceeding a predetermined accidental fire line 28 using the gas turbine ECU 11, the operating point control unit 32 moves the power operating point of the gas turbine element 2 from the first gas turbine power operating point 61 to the second gas turbine power operating point 62 (Step S25). The accidental fire line 28 is a fuel line of a case in which a decrease in the load is detected. Simultaneously with the control of Step S25, the operating point control unit 32 moves the power operating point of the power generator 3 from the first power generator power operating point 71 to the second power generator power operating point 72 along the reference operation line 35 using the power generator ECU 12 (Step S27). In Step S27, the operating point control unit 32 controls the rotation number Ne and the torque T of the power generator 3 such that the power operating point of the power generator 3 follows the reference operation line 35 while matching a displacement of the rotation number Ne at the power operating point of the gas turbine element 2 in Step S25.

Next, the operating point control unit 32 moves the power operating point of the gas turbine element 2 from the second gas turbine power operating point 62 to the third gas turbine power operating point 63 using the gas turbine ECU 11 with the torque T maintained to be constant (Step S29). Simultaneously, the operating point control unit 32 moves the power operating point of the power generator 3 from the second power generator power operating point 72 to the third power generator power operating point 73 along the reference operation line 35 using the power generator ECU 12. In Step S29, the operating point control unit 32 performs control of the rotation number Ne and the torque T of the power generator 3 such that the power operating point of the power generator 3 follows the reference operation line 35 while matching a displacement of the rotation number Ne at the power operating point of the gas turbine element 2.

Next, the operating point control unit 32 maintains the power operating point of the gas turbine element 2 for a predetermined time without moving from the third gas turbine power operating point 63 using the gas turbine ECU 11 and thus sets the power operating point to the target gas turbine power operating point 64 (Step S31). Simultaneously, the operating point control unit 32 moves the power operating point of the power generator 3 to the target gas turbine power operating point 74 using the power generator ECU 12 while constantly maintaining the rotation number Ne from the third power generator power operating point 73 within a predetermined time.

After the predetermined time elapses, the torque T of the power generator 3 matches the torque of the third gas turbine power operating point 63, whereby the power operating points reach the target power operating points 64 and 74 (Step S33).

After reaching the target power operating points 64 and 74, the operating point control unit 32 transitions the propulsion system 1 to a normal drive mode and ends the movement control of the power operating points (Step S35).

Figure 8:
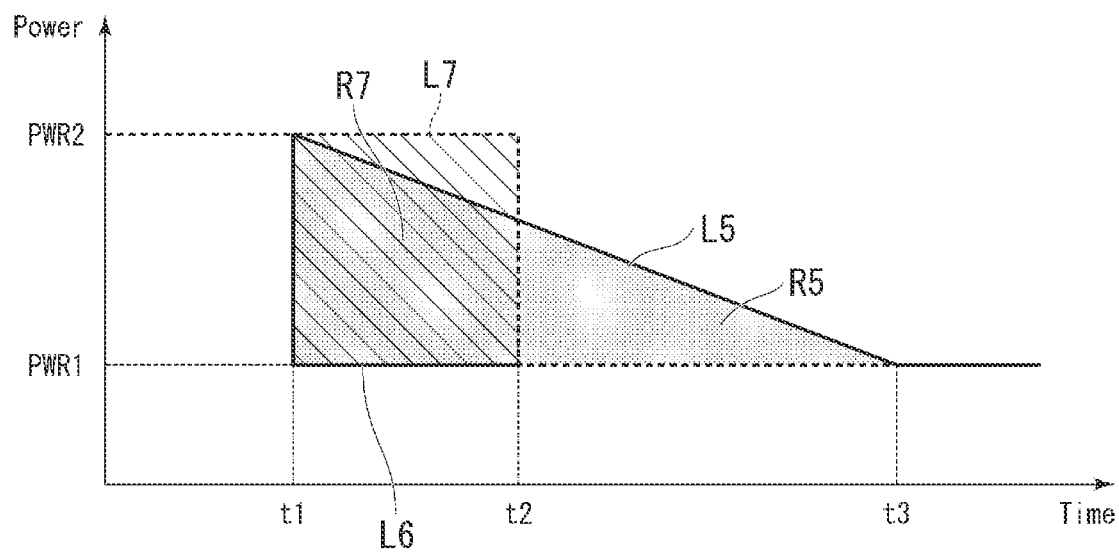
FIG. 8 is a graph showing a power supply amount in a case in which the load for the propulsion system according to the first embodiment is decreased.

FIG. 8 is a graph representing a power supply amount supplied in a case in which a load for the propulsion system according to the first embodiment is decreased. In FIG. 8, an electric power Power2 required for the propulsion system 1 before an occurrence of a load change is represented. In addition, an electric power Power1 required for the propulsion system 1 after an occurrence of a load change is represented. A straight line L6 represents a trend of electric power required for the propulsion system 1 when a load change of a decrease occurs. A straight line L5 represents a trend of electric power that can be followed by the power generator 3 when a load change of a decrease occurs in the conventional technology. A straight line L7 represents a trend of electric power that can be followed by the power generator 3 when a load change of a decrease occurs in this embodiment.

As represented in the straight line L6 shown in FIG. 8, in a case in which a load change of a decrease occurs at time t1, the electric power required for the propulsion system 1 sharply decreases from Power2 to Power1. In contrast to this, in a conventional technology in which the electric power is decreased by decreasing the fuel flow Wf to the gas turbine element 2, as represented by the straight line L5, the generated electric power of the power generator 3 gently descends over time t1 to time t3 in accordance with a decrease in the fuel flow Wf. For this reason, a difference between the required electric power (the straight line L6) and an actual supplied electric power (the straight line L5) needs to be absorbed by the battery. In other words, a size of an area R5 surrounded by the straight line L6 and the straight line L5 in FIG. 8 is equal to an electric energy extracted from the battery in the conventional technology.

On the other hand, in the propulsion system 1 according to this embodiment in which power operating points are controlled by the operating point control unit 32, as represented by the straight line L7, although an output between time t1 to time t2 (<t3) is maintained to be Power2, a power supply amount can be sharply decreased at time t2. The size of an area R7 surrounded by a straight line L6 and a straight line L7 shown in FIG. 8 is equal to an electric energy to be absorbed by the battery 5 in this embodiment.

Here, in a case where a time interval from t1 to t2 is shorter than a time interval from t2 to t3, the area R7 is smaller than the area R5. Thus, compared with the conventional technology, the amount of electric energy absorbed by the battery 5 can be reduced.

According to the configuration described above, compared with the conventional technology in which deceleration is gradually performed by decreasing the fuel flow Wf to the gas turbine element 2, and electric power is absorbed, the power supply amount can be sharply decreased at a predetermined timing (for example, a timing corresponding to time t2 shown in FIG. 5). By completing deceleration transient in a short period of time, the area of a region defined by a product of a magnitude of electric power and a time is decreased, and thus, compared with the conventional technology, the amount of electric energy absorbed by the battery 5 can be reduced.

(Operation and Effect)

Next, operations and effects of the propulsion system 1 described above will be described.

According to the propulsion system 1 of this embodiment, in a case in which a load change occurs, the operating point control unit 32 responds to an increase/decrease in the output according to the load change by moving power operating points. More specifically, first, for the first power operating points 41, 51, 61, and 71, the operating point control unit 32 calculates the target power operating points 44, 54, 64, and 74 corresponding to the load after change. Next, by changing the fuel flow Wf in a range not exceeding a predetermined fuel line (the surge line 27 or the accidental fire line 28), the power operating points of the gas turbine element 2 and the power generator 3 are moved to the second power operating points 42, 52, 62, and 72. In accordance with this, while the output from the power generator 3 is maintained, the torque T of the gas turbine element 2 is increased. Thereafter, the operating point control unit 32 moves the power operating points of the gas turbine element 2 to the third gas turbine power operating points 43 and 63 matching the target power operating points 44 and 64 with the torque T maintained to be constant and, at the same time, moves the power operating points of the power generator 3 to the third power generator power operating points 53 and 73 that are on the reference operation line 35 and have the same rotation number Ne as the third gas turbine power operating points 43 and 63. In this way, the torque T of the gas turbine element 2 is increased, and the torque T of the power generator 3 is decreased. In accordance with this, a difference between the torque of the gas turbine element 2 and the torque of the power generator 3 becomes large. Furthermore, the operating point control unit 32 sets the third gas turbine power operating points 43 and 63 as the target gas turbine power operating points 44 and 64 and, at the same time, moves the power operating points of the power generator 3 to the target power generator power operating points 54 and 74. For the third gas turbine power operating points 43, 53, 63, and 73, a difference between the torques of the gas turbine element 2 and the power generator 3 is large, and thus the power operating points of the power generator 3 can be moved to the target power operating points 54 and 74 in a short period of time. Thus, the output from the power generator 3 can be caused to follow a load change in a very short period of time from an occurrence of the load. An amount of electric power of the battery 5 that is defined by a product of electric power and time can be decreased, and thus, compared with the conventional technology, the size of the battery 5 can be decreased. In addition, the use frequency of the battery 5 is decreased, and thus the cooling system for the battery 5 can be decreased in size, and reduction of the life of the battery 5 can be inhibited.

Therefore, compared with the conventional technology, the propulsion system 1 of an aircraft capable of decreasing the battery 5 and the cooling system thereof in size and inhibiting reduction in the life of the battery can be provided.

In a case in which the load is increased, the operating point control unit 32 increases the fuel flow Wf in a range not exceeding the surge line 27. In accordance with this, while the fuel is used with high efficiency, an increase in the load variations can be quickly followed. In addition, the amount of electric power supplemented by the battery 5 can be decreased. Accordingly, an increase in the load variation can be responded to while the amount of electric power extracted from the battery 5 is decreased more than the conventional case.

In a case in which the load is decreased, the operating point control unit 32 decreases the fuel flow Wf in a range not exceeding the accidental fire line 28. In accordance with this, a decrease in the load variation can be quickly followed while the gas turbine element 2 is operated stably. In addition, the amount of electric power absorbed by the battery 5 can be decreased. Thus, a decrease in the load variation can be responded to while the amount of electric power accumulated in the battery 5 is decreased more than in the conventional case.

Second Embodiment

Figure 9:
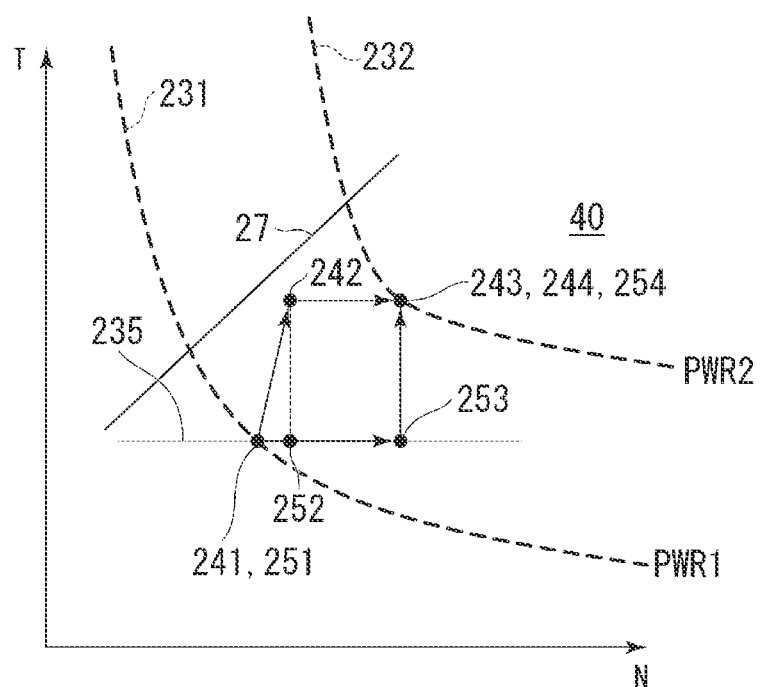
FIG. 9 is an operating point map showing control using an operating point control unit in a case in which a load is increased in a second embodiment.

Next, a second embodiment of the present disclosure will be described. FIG. 9 is an operating point map 40 showing control using the operating point control unit 32 in a case in which a load is increased in a second embodiment. In description presented below, the same reference signs will be assigned to configurations similar to those of the first embodiment described above, and description thereof will be appropriately omitted. In this embodiment, a power operation line of a power generator 3 moves along a torque constant line 235, which is different from the first embodiment described above.

In the second embodiment, the operating point map 40 has the torque constant line 235 in place of the reference operation line 35 according to the first embodiment. The torque constant line 235 is a straight line at which the torque is constant. In other words, the torque at an arbitrary power operating point on the torque constant line 235 is represented as $T=\beta$ (constant). A rotation number Ne at an arbitrary power operating point on the torque constant line 235 may take an arbitrary value.

(Operation of Operating Point Control Unit in Case in which a Change in Load Occurs Such that Load Increases)

In FIG. 9, reference numerals 241, 242, 243, and 244 represent power operating points of the gas turbine element 2, and reference numerals 251, 252, 253, and 254 represent power operating points of the power generator 3. In the second embodiment, when a change (increase) in the load is detected by a load change detecting unit 31, an operating point control unit 32 detects first power operating points 241 and 251 that are current power operating points on the operating point map 40 and calculates target power operating points 244 and 254. At this time, the operating point control unit 32 selects points at which the drive efficiency is the highest on an operation line 231 on which T×Ne is constant as first power operating points 241 and 251. Similarly, the operating point control unit 32 selects points at which the drive efficiency is the highest on an operation line 232 after the load change as target power operating points 244 and 254.

The first gas turbine power operating point 241 and the first power generator power operating point 251 are located at the same point. Each of the first gas turbine power operating points 241 and 251 are located on the torque constant line 235.

The operating point control unit 32, first, calculates target power operating points 244 and 254 for the first power operating points 241 and 251. The target power operating points 244 and 254 are located at a point at which the torque T and the rotation number Ne are larger than those at the first power operating points 241 and 251, in other words, a point at which an output is larger than the torque constant line 235. The target gas turbine power operating point 244 and the target power generator power operating point 254 are located at the same point.

Next, by performing acceleration by increasing the fuel flow Wf within a range not exceeding a predetermined surge line 27 using the gas turbine ECU 11, the operating point control unit 32 moves the power operating point of the gas turbine element 2 from the first gas turbine power operating point 241 to the second gas turbine power operating point 242. The second gas turbine power operating point 242 is a power operating point that is disposed between the first gas turbine power operating point 241 and the target gas turbine power operating point 244 with respect to the rotation number Ne and has the same torque T as the target gas turbine power operating point 244. The second gas turbine power operating point 242 has a torque that is equal to the torques of the target power operating points 244 and 254 and is selected to pass through an area not reaching the surge line 27.

Simultaneously, the operating point control unit 32 moves the power operating point of the power generator 3 from the first power generator power operating point 251 to the second power generator power operating point 252 along the torque constant line 235 using the power generator ECU 12. The second power generator power operating point 252 is a power operating point that is disposed on the torque constant line 235 and has the same rotation number Ne as the second gas turbine power operating point 242. The operating point control unit 32 performs control of the rotation number Ne and the torque T of the power generator 3 such that the power operating point of the power generator 3 follows the torque constant line 235 while matching the displacement of the rotation number Ne at the power operating point of the gas turbine element 2.

Next, the operating point control unit 32 moves the power operating point of the gas turbine element 2 from the second gas turbine power operating point 242 to the third gas turbine power operating point 243 with the torque T maintained to be constant using the gas turbine ECU 11. The third gas turbine power operating point 243 matches the target gas turbine power operating point 244.

Simultaneously, the operating point control unit 32 moves the power operating point of the power generator 3 from the second power generator power operating point 252 to the third power generator power operating point 253 along the torque constant line 235 using the power generator ECU 12. The third power generator power operating point 253 is a power operating point that is disposed on the torque constant line 235 and has the same rotation number Ne as the third gas turbine power operating point 243.

Next, the operating point control unit 32 maintains the power operating point of the gas turbine element 2 for a predetermined time without moving the power operating point from the third gas turbine power operating point 243 using the gas turbine ECU 11, thereby setting the power operating point as the target gas turbine power operating point 244. Simultaneously, the operating point control unit 32 moves the power operating point of the power generator 3 from the third power generator power operating point 253 to the target power generator power operating point 254 within a predetermined time with the rotation number Ne maintained to be constant using the power generator ECU 12.

After the predetermined time elapses, power operating points reach the target power operating points 244 and 254. As above, movement control of power operating points using the operating point control unit 32 ends.

Figure 10:
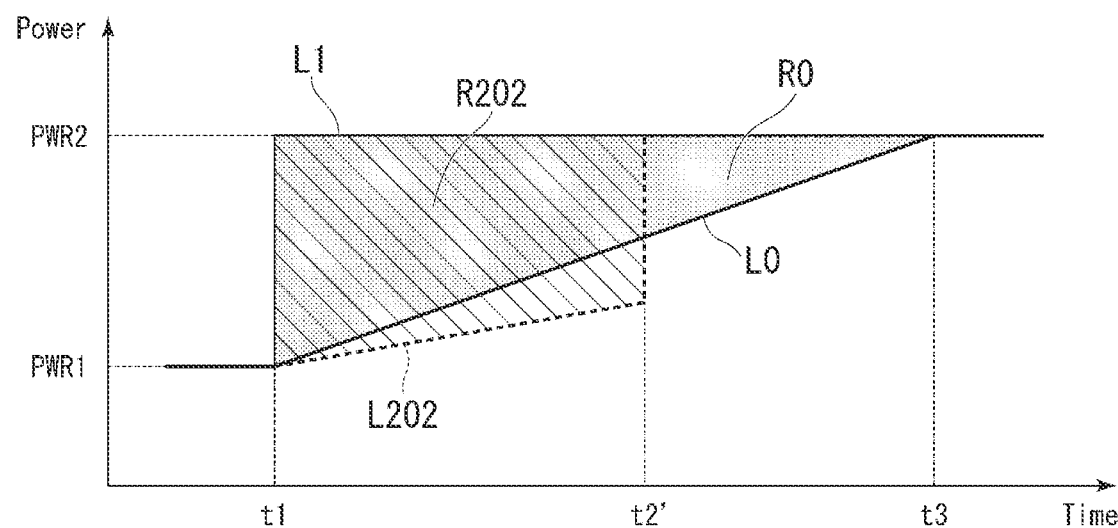
FIG. 10 is a graph representing a power supply amount in a case in which a load for the propulsion system according to the second embodiment is increased.

FIG. 10 is a graph representing a power supply amount in a case in which a load for the propulsion system 1 according to the second embodiment is increased. A straight line L202 represents a trend of electric power that can be followed when a load change of an increase occurs in the second embodiment. In addition, straight lines L1 and L0 are similar to those according to the first embodiment, and thus, hereinafter, description thereof will be omitted.

As represented by a straight line L202 shown in FIG. 10, in the propulsion system according to the second embodiment, after the output gently increases between time t1 to t2', the power supply amount can be sharply increased at time t2'. A time interval between time t1 to time t2' according to the second embodiment shown in FIG. 10 is longer than the time interval between time t1 to time t2 according to the first embodiment shown in FIG. 5.

Here, an area R202 may be configured to be smaller than the area R0. Thus, compared with the conventional technology, the amount of electric energy extracted from the battery 5 can be reduced.

(Operation of Operating Point Control Unit in Case in which a Change in Load Occurs Such that Load Decreases)

Next, an operation of the operating point control unit according to the second embodiment in a case in which a load change occurs such that the load decreases will be described.

Figure 11:
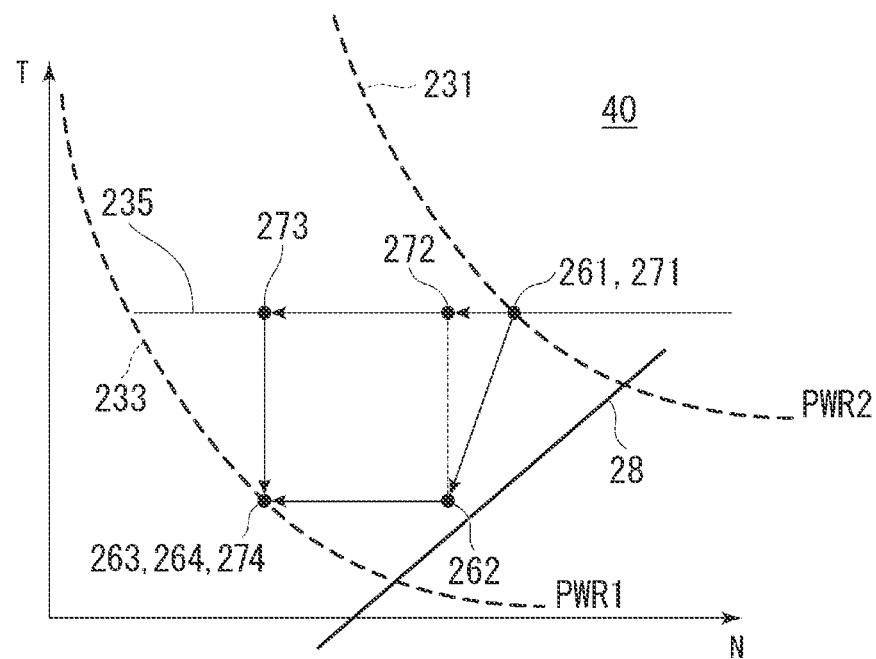
FIG. 11 is an operating point map showing control using the operating point control unit in a case in which the load is decreased in the second embodiment.

FIG. 11 is an operating point map 40 showing control using the operating point control unit in a case in which the load is decreased in the second embodiment.

In FIG. 11, reference numerals 261, 262, 263, and 264 represent power operating points of the gas turbine element 2, and reference numerals 271, 272, 273, and 274 represent power operating points of the power generator 3. According to the second embodiment, when a change (decrease) in the load is detected by the load change detecting unit 31, the operating point control unit 32 detects first power operating points 261 and 271 that are current power operating points and calculates target power operating points 264 and 274. At this time, the operating point control unit 32 selects points at which the drive efficiency is the highest on an operation line 231 in which T×Ne is constant as first power operating points 261 and 271. Similarly, the operating point control unit 32 selects points at which the drive efficiency is the highest on an operation line 233 after the load change as target power operating points 264 and 274.

The first gas turbine power operating point 261 and the first power generator power operating point 271 are located at the same point. The first power operating points 261 and 271 are located on the torque constant line 235.

The operating point control unit 32, first, calculates target power operating points 264 and 274 for the first power operating points 261 and 271. The target power operating points 264 and 274 are located at a point at which the torque T and the rotation number Ne are smaller than those at the first power operating points 261 and 271, in other words, a point at which an output is smaller than the torque constant line 235. The target gas turbine power operating point 264 and the target power generator power operating point 274 are located at the same point.

Next, by performing deceleration by decreasing the fuel flow Wf within a range not exceeding a predetermined accidental fire line 28 using the gas turbine ECU 11, the operating point control unit 32 moves the power operating point of the gas turbine element 2 from the first gas turbine power operating point 261 to the second gas turbine power operating point 262. The second gas turbine power operating point 262 is a power operating point that is, with respect to the rotation number Ne, disposed between the target gas turbine power operating point 264 and the first gas turbine power operating point 261 and has the same torque T as the target gas turbine power operating point 264. The second gas turbine power operating point 262 has a torque that is equal to the torques of the target power operating points 264 and 274 and is selected to pass through an area not reaching the accidental fire line 28.

Simultaneously, the operating point control unit 32 moves the power operating point of the power generator 3 from the first power generator power operating point 271 to the second power generator power operating point 272 along the torque constant line 235 using the power generator ECU 12. The second power generator power operating point 272 is a power operating point that is disposed on the torque constant line 235 and has the same rotation number Ne as the second gas turbine power operating point 262. The operating point control unit 32 performs control of the rotation number Ne and the torque T of the power generator 3 such that the power operating point of the power generator 3 follows the torque constant line 235 while matching a displacement of the rotation number Ne at the power operating point of the gas turbine element 2.

Next, the operating point control unit 32 moves the power operating point of the gas turbine element 2 from the second gas turbine power operating point 262 to the third gas turbine power operating point 263 with the torque T maintained to be constant using the gas turbine ECU 11. The third gas turbine power operating point 263 matches the target gas turbine power operating point 264.

Simultaneously, the operating point control unit 32 moves the power operating point of the power generator 3 from the second power generator power operating point 272 to the third power generator power operating point 273 along the torque constant line 235 using the power generator ECU 12. The third power generator power operating point 273 is a power operating point that is disposed on the torque constant line 235 and has the same rotation number Ne as the third gas turbine power operating point 263.

Next, the operating point control unit 32 maintains the power operating point of the gas turbine element 2 for a predetermined time without moving the power operating point from the third gas turbine power operating point 263 using the gas turbine ECU 11, thereby setting the power operating point as the target gas turbine power operating point 264. Simultaneously, the operating point control unit 32 moves the power operating point of the power generator 3 from the third power generator power operating point 273 to the target power generator power operating point 274 within a predetermined time to the target power generator power operating point 274 with the rotation number Ne maintained to be constant using the power generator ECU 12.

After the predetermined time elapses, power operating points reach the target power operating points 244 and 254. As above, movement control of power operating points using the operating point control unit 32 ends.

Figure 12:
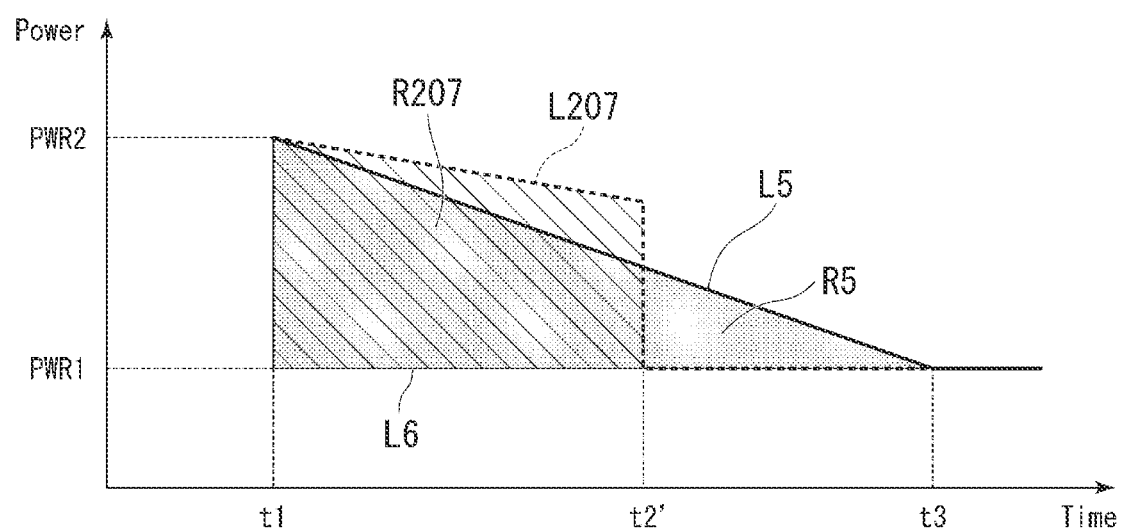
FIG. 12 is a graph showing a power supply amount in a case in which the load for the propulsion system according to the second embodiment is decreased.

FIG. 12 is a graph representing a power supply amount supplied in a case in which a load for the propulsion system 1 according to the second embodiment is decreased. A straight line L207 represents a trend of electric power that can be followed when a load change of a decrease occurs in the second embodiment. Straight lines L5 and L6 are similar to those according to the first embodiment, and thus, hereinafter, description thereof will be omitted.

As represented by the straight line L207 shown in FIG. 12, in the propulsion system 1 according to the second embodiment, after the output gently decreases between time t1 to time t2', the power supply amount can be sharply decreased at the time t2'.

An area R207 surrounded by the straight line L6 and the straight line L207 represents a magnitude of electric power absorbed by the battery 5 in a case in which the load decreases in the second embodiment. The area R207 may be configured to be smaller than the area R5. Thus, compared with the conventional technology, the amount of electric energy absorbed by the battery 5 can be reduced.

According to the configuration described above, compared with the conventional technology in which deceleration is gradually performed by decreasing the fuel flow Wf to the gas turbine element 2, and electric power is absorbed, the power supply amount can be sharply decreased at a predetermined timing (for example, a timing corresponding to time t2 shown in FIG. 10). In addition, the amount of electric power absorbed by the battery 5 can be decreased.

According to the propulsion system 1 of the second embodiment, the operating point control unit 32 moves power operating point of the gas turbine element 2 from the first gas turbine power operating points 241 and 261 to the second gas turbine power operating points 242 and 262 and the third gas turbine power operating points 243 and 263 in order. Simultaneously, the operating point control unit 32 moves the power operating points of the power generator 3 to the second power generator power operating points 252 and 272 and the third power generator power operating points 253 and 273 in order along the torque constant line 235. By moving the power operating points of the power generator 3 with the torque T maintained to be constant, a difference between the torque of the gas turbine element 2 and the torque of the power generator 3 can be increased while the output from the power generator 3 is changed in accordance with a load change. Thereafter, the operating point control unit 32 sets the third gas turbine power operating points 243 and 263 as the target gas turbine power operating points 244 and 264 and, simultaneously, moves the power operating points of the power generator 3 to the target power generator power operating points 254 and 274. A torque difference between the gas turbine elements 2 and the power generator 3 is large for the third power operating points 243, 253, 263, and 273, and thus the power operating points of the power generator 3 can be moved to the target power operating points 254 and 274 in a short period of time. Thus, the output from the power generator 3 can be caused to follow a load change in a very short period of time from an occurrence of the load. As a result, an amount of electric power of the battery 5 that is defined by a product of electric power and time can be decreased, and thus, compared with the conventional technology, the size of the battery 5 can be decreased. In addition, the use frequency of the battery 5 is decreased, and thus the cooling system for the battery 5 can be decreased in size, and reduction of the life of the battery 5 can be inhibited.

Therefore, compared with the conventional technology, the propulsion system 1 of an aircraft capable of decreasing the battery 5 and the cooling system thereof in size and inhibiting reduction in the life of the battery can be provided.

In a case in which the load is increased, the operating point control unit 32 increases the fuel flow Wf in a range not exceeding the surge line 27. According to the configuration of the second embodiment, compared with the conventional technology, while the responsiveness is improved, the amount of electric power supplemented by the battery 5 can be decreased. Here, in the second embodiment, the amount of electric power increases more gently than that according to the first embodiment. For this reason, in the second embodiment, when compared with the first embodiment, although the responsiveness is degraded, the load for the battery 5 can be reduced. Accordingly, the durability of the battery 5 can be further improved.

In a case in which the load is decreased, the operating point control unit 32 decreases the fuel flow Wf in a range not exceeding the accidental fire line 28. According to the configuration of the second embodiment, compared with the conventional technology, while the responsiveness is improved, the amount of electric power absorbed by the battery 5 can be decreased. Here, in the second embodiment, compared with the first embodiment, the amount of electric power decreases gently. For this reason, in the second embodiment, when compared with the first embodiment, although the responsiveness is degraded, the load for the battery 5 can be reduced. Accordingly, the durability of the battery 5 can be further improved.

The technical scope of the present disclosure is not limited to the embodiments described above, and various changes can be made in a range not departing from the concept of the present disclosure.

For example, in the embodiments described above, although the configuration having a single gas turbine element 2 has been described, the propulsion system 1 may include a plurality of gas turbine elements 2.

The power generator 3 may be disposed between the compressor 21 and the turbine 22 in an axial direction.

The positions of the power operating points are not limited to the positions shown in FIGS. 3, 6, 9, and 11. A timing at which the output from the power generator transitions from Power1 to Power2 (time t2 and time t2' shown in FIGS. 5 and 10) is not limited to the shown timing. A length from time t1 to time t2 (or time t2'), a length from time t2 (or time t2') to time t3, and the like may be changed appropriately.

Additionally, substitutions of the constituent elements according to the embodiments described above with known constituent elements can be performed appropriately in a range not departing from the concept of the present disclosure, and the embodiments described above may be appropriately combined.

While preferred embodiments of the invention have been described and shown above, it should be understood that these are exemplary of the invention and are not to be considered as limiting. Additions, omissions, substitutions, and other modifications can be made without departing from the spirit or scope of the present disclosure. Accordingly, the invention is not to be considered as being limited by the foregoing description and is only limited by the scope of the appended claims.

EXPLANATION OF REFERENCES 1 propulsion system of aircraft
2 gas turbine element
3 power generator
5 battery
7 electric motor
8 propeller
11 gas turbine ECU (gas turbine control unit)
12 power generator ECU (power generator control unit)
15 flight state detecting unit
21 compressor
22 turbine
25 rotation shaft
27 surge line (fuel line)
28 accidental fire line (fuel line)
31 load change detecting unit
32 operating point control unit
35 reference operation line
40 operating point map
41, 61, 241, 261 first gas turbine power operating point (first power operating point)
42, 62, 242, 262 second gas turbine power operating point
43, 63, 243, 263 third gas turbine power operating point
44, 64, 244, 264 target gas turbine power operating point (target power operating point)
51, 71, 251, 271 first power generator power operating point (first power operating point)
52, 72, 252, 272 second power generator power operating point
53, 73, 253, 273 third power generator power operating point
54, 74, 254, 274 target power generator power operating point (target power operating point)
235 torque constant line
T torque
Ne rotation number

What is claimed is:

1. A propulsion system of an aircraft mounted in an airframe of the aircraft, the propulsion system comprising:
a gas turbine element including a compressor and a turbine that rotates integrally with the compressor;
a power generator connected to the gas turbine element through a rotation shaft;
a battery accumulating electric power generated by the power generator;
an electric motor driven by at least one of electric power from the power generator and electric power from the battery;
a propeller driven by the electric motor;
a gas turbine control unit controlling an output of the gas turbine element;
a power generator control unit controlling an amount of generated power of the power generator;
one or more sensors for detecting a flight state of the aircraft;
and
wherein the gas turbine control unit and power generator control unit are configured to control power operating points which are each defined using a torque and a rotation number of the rotation shaft based on the flight state detected by the one or more sensors
and a reference operation line acquired by joining a plurality of power operating points at which an output defined as a product of the torque and the rotation number is constant on an operating point map onto which the power operating points are mapped, and
wherein:
target power operating points to a load after a change in the load for first power operating points that are current power operating points on the operating point map in a case in which a change in the load is detected;
by changing a fuel flow in a range not exceeding a predetermined fuel line using the gas turbine control unit, the gas turbine control unit moves the power operating points of the gas turbine element from the first power operating points present on the reference operation line to second gas turbine power operating points that have the same torques as the target power operating points and, at the same time, the power generator control unit moves power operating points of the power generator from the first power operating points present on the reference operation line to second power generator power operating points that are present on the reference operation line and have the same rotation numbers as the second gas turbine power operating points using the power generator control unit; and after the power operating points are moved to the second gas turbine power operating points and the second power generator power operating points, the gas turbine control unit moves the power operating points of the gas turbine element from the second gas turbine power operating points to third gas turbine power operating points matching the target power operating points with the torque maintained to be constant, at the same time, the power generator control unit moves the power operating points of the power generator from the second power generator power operating points to third power generator power operating points that are present on the reference operation line and have the same rotation number as the third gas turbine power operating points, and, after the power operating points are moved to the third gas turbine power operating points and the third power generator power operating points, the gas turbine control unit sets the power operating points of the gas turbine element as the target power operating points by maintaining the power operating points for a predetermined time without moving the power operating points from the third gas turbine power operating points and, at the same time, the power generator control unit moves the power operating points of the power generator from the third power generator power operating points to the target power operating points within the predetermined time.

2. The propulsion system of the aircraft according to claim 1,
wherein, in a case in which an increase in the load is detected, the predetermined fuel line is a surge line, and
wherein the gas turbine control unit moves the power operating points of the gas turbine element by increasing the fuel flow in a range not exceeding the surge line.

3. The propulsion system of the aircraft according to claim 1,
wherein, in a case in which a decrease in the load is detected, the predetermined fuel line is an accidental fire line, and
the gas turbine control unit moves the power operating points of the gas turbine element by decreasing the fuel flow in a range not below the accidental fire line.

4. A propulsion system of an aircraft mounted in an airframe of the aircraft, the propulsion system comprising:
a gas turbine element including a compressor and a turbine that rotates integrally with the compressor;
a power generator connected to the gas turbine element through a rotation shaft;
a battery accumulating electric power generated by the power generator;
an electric motor driven by at least one of electric power from the power generator and electric power from the battery;
a propeller driven by the electric motor;
a gas turbine control unit controlling an output of the gas turbine element;
a power generator control unit controlling an amount of generated power of the power generator;
one or more sensors for detecting a flight state of the aircraft;
and
wherein the gas turbine control unit and power generator control unit are configured to control power operating points which are each defined using a torque and a rotation number of the rotation shaft based on the flight state detected by the one or more sensors
and a torque constant line at which the torque is constant on an operating point map onto which the power operating points are mapped, and
wherein:
target power operating points are calculated which correspond to a load after a change in the load for first power operating points that are current power operating points on the operating point map in a case in which the change in the load is detected;
by changing a fuel flow in a range not exceeding a predetermined fuel line using the gas turbine control unit, the gas turbine control unit moves power operating points of the gas turbine element from the first power operating points present on the torque constant line to second gas turbine power operating points that have the same torques as the target power operating points and, at the same time, the power generator control unit moves power operating points of the power generator from the first power operating points present on the torque constant line to second power generator power operating points that are present on the torque constant line and have the same rotation numbers as the second gas turbine power operating points using the power generator control unit; and
after the power operating points are moved to the second gas turbine power operating points and the second power generator power operating points, the gas turbine control unit moves the power operating points of the gas turbine element from the second gas turbine power operating points to third gas turbine power operating points matching the target power operating points with the torque maintained to be constant, at the same time, the power generator control unit moves the power operating points of the power generator from the second power generator power operating points to third power generator power operating points that are present on the torque constant line and have the same rotation number as the third gas turbine power operating points, and, after the power operating points are moved to the third gas turbine power operating points and the third power generator power operating points, the gas turbine control unit sets the power operating points of the gas turbine element as the target power operating points by maintaining the power operating points for a predetermined time without moving the power operating points from the third gas turbine power operating points and, at the same time, moves the power operating points of the power generator from the third power generator power operating points to the target power operating points within the predetermined time.

5. The propulsion system of the aircraft according to claim 4,
wherein, in a case in which an increase in the load is detected, the predetermined fuel line is a surge line, and wherein the gas turbine control unit moves the power operating points of the gas turbine element by increasing the fuel flow in a range not exceeding the surge line.

6. The propulsion system of the aircraft according to claim 4, wherein, in a case in which a decrease in the load is detected, the predetermined fuel line is an accidental fire line, and wherein the gas turbine control unit moves the power operating points of the gas turbine element by decreasing the fuel flow in a range not below the accidental fire line.

* * * * *